United States Patent Office 3,210,382
Patented Oct. 5, 1965

3,210,382
REGENERATION OF DEGRADED WORKING SOLUTION BY TREATMENT WITH A MINERAL ACID AFTER THE EXTRACTION OF $H_2O_2$ FROM THE OXIDATION STEP
René Speltinckx and Robert Jones, Brussels, Belgium, assignors to Solvay & Cie, Brussels, Belgium, a Belgian company
No Drawing. Filed Feb. 5, 1962, Ser. No. 171,256
Claims priority, application Netherlands, Feb. 14, 1961, 261,223
4 Claims. (Cl. 260—369)

The present invention concerns a process of regenerating and purifying the working or carrier solution used for making oxygenated water by repeated cycles of catalytic hydrogenation of an alkyl anthraquinone and of oxidation of the alkylanthrahydroquinone thus formed.

It is known that in this process (see CIOS Report XIX–4 for example) one starts from a solution of an alkylanthraquinone in a solvent or mixture of solvents, submitting the product to catalytic hydrogenation in the presence of Raney nickel or of palladium in such a way as to transform all or part of the alkylanthraquinone into alkylanthrahydroquinone, then oxidising the solution by means of oxygen or air to reform the quinone and to produce hydrogen peroxide, the latter being separated with the air of water and the remaining solution being recycled to the hydrogenation.

The complete cycle of manufacture of the oxygenated water is unfortunately accompanied by secondary reactions which have the effect of progressively changing the alkylanthraquinone present in the working solution.

One of these secondary reactions consists of a hydrogenation of one of the side-nuclei of the alkylanthraquinone which leads to the formation in the working solution of a more or less large quantity of the corresponding tetra-hydrogenated derivative. The latter can take part in the manufacturing cycle of the hydrogen peroxide but it presents two disadvantages; it is less soluble in the solvents used than the initial quinone (which can lead to the formation of undesirable deposits in certain places in the apparatus) and its rate of oxidation is lower than that of the quinone not hydrogenated on the nucleus (causing reduction of the conversion rate and consequently the production capacity of the plant). Furthermore, other compounds whose nature is not known for certain, form progressively in the working solution by degradation of the quinones. These compounds no longer take part in the production of oxygenated water and their presence in the working solution incurs serious disadvantages among which the following may be mentioned:

Degradation of the alkylanthraquinones which are relatively expensive products;

The necessity of adding quinone periodically to compensate that rendered inactive by degradation so as to maintain the production capacity of the plant; this addition has the effect of raising the specific weight of the working solution which appreciably complicates extraction of the oxygenated water set free in the oxidation stage;

The risk of introducing impurities into the oxygenated water obtained.

It is clear from the foregoing that the production of oxygenated water by the alkylanthraquinone process cannot be economically exploited without the use of a process permitting regeneration of active quinones from the degradation products not taking part in the cycles of production of the oxygenated water. The economy of the process will be the more improved, the more the yield of the regeneration is raised to a higher level. Furthermore, care must be taken that the quantity of tetrahydroalkylanthraquinone present in the working solution does not exceed the limits of its solubility.

It has been proposed to achieve this object by treating the working solution at elevated temperature by pellets or granules of calcium oxide or hydroxide (French Patent No. 1,206,809) or by the action of an oxidising agent in the presence of an organic or inorganic base (Belgian Patent No. 579,990). The best rates of conversion of the product of degration into active quinones obtained by these processes are respectively 59% and 43%.

According to another process (U.S. Patent 2,901,490) active quinones are regenerated from the degradation products by subjecting the degraded working solution to the reducing action of zinc or magnesium, in the presence of acetic acid, formic acid or sulphuric acid; alkylanthrahydroquinones are thus formed which are oxidised by air to give the corresponding quinone, which can be recycled to the hydrogenation step of the production cycle for oxygenated water. The best rate of conversion for the regeneration according to this process is, according to the patent, of the order of 50%.

The applicants have found a process which forms the object of the present invention, according to which superior regeneration yields are obtained. This process consists in operating in two successive stages, the first consisting of treating the working solution with a mineral acid which has the property of an extremely high conversion of the degradation product which cannot be used into tetrahydroalkylanthraquinone, and the second stage consisting of oxidising the latter into quinone which is not hydrogenated on the nucleus. This oxidation which is not claimed as such in the present patent can be carried out by a known process, notably by the action of air on tetrahydroanthraquinone in alcoholic alkaline solution as described by Diels, Alder and Stein (Ber. Deutsch. Chem. Ges., 1929, 62, pp. 2337–372) or H. J. Backer and J. Strating (Rec. Trav. Chim., 1934, 53, pp. 538–539).

By the process in two stages, acidification followed by dehydrogenation, discovered by the applicants, regeneration yields are obtained which are far superior to those previously described, as is shown in the examples given later.

The acid treatment which is claimed in the present patent, can be carried out by means of all mineral acids, especially hydrochloric acid, sulphuric acid, nitric acid, phosphoric acid, etc.

The conditions of this treatment may vary within wide limits.

In particular the temperature can be between ambient temperature and the boiling point of the reaction mixture. Since the rate of reaction rises with temperature, the range between 40 and 80° C. is preferred. In certain cases however, the limit of temperature can be lower so as to avoid undesirable secondary reactions; thus when using nitric acid which is 6 N or more concentrated, it is best not to exceed the limit of 50° C. so as to avoid giving rise to a nitration reaction.

The acids can be applied in the gaseous state or in aqueous solution. In the latter case concentrations are generally used which are above 6 N so as to avoid the use of excessive temperatures. Thus, for example the regeneration by 2 N hydrochloric acid can be carried out at an appreciable rate only by boiling.

The quantity of acid applied can be determined by experiments. In a general way, the applicants have found that regeneration is effected rapidly when the carrier solution is brought into contact with a quantity of acid equivalent to 10% of its weight.

The means of application depend on the nature of the acid used; in the case of gaseous acids one can for example operate by bubbling, by agitation or by passing through a column in the other cases.

In principle the regeneration of the working solution can be carried out before or after extraction with water of the hydrogen peroxide. It appears preferable, however, to carry it out after the extraction so as to avoid losing hydrogen peroxide by entrainment in the acid and in the washing water used after acidification.

The treatment can equally be carried out in the presence or absence of air, which has no effect on the efficiency of regeneration.

Finally, a third solvent may be added if desired, for example an alcohol. In most cases this addition is not indispensable however. The applicants have found that the process of the invention permits not only regeneration of the working solution but it brings with it a further result, namely the separation of the metallic compounds which can accumulate in the solution as a result of the degradation of the hydrogenation catalysts, corrosion of the apparatus or any other cause. These metals are present in the working solution in the form of salts of organic acids or organometallic complexes soluble in the carrier solution but practically insoluble in water. It is readily understood that their presence is prejudicial to the satisfactory progress of the process; there is a risk in particular of catalysing, in the oxidation step, the decomposition of the oxygenated water produced. The acid treatment for regeneration of the working solution, practiced according to the invention, however, leads at the same time to a quantitative separation of the metallic impurities. This result is shown in Example 1 in the following.

The process according to the invention can be applied for the regeneration of any working solution based on alkylanthraquinone which is degraded in the course of its repeated use for the production of oxygenated water. It can be applied for the periodic regeneration of the entire working solution, or one can withdraw periodically or continuously a part of the solution, treat it according to the invention and return it to the cycle of manufacture.

The examples given below describe the manner of applying the process and emphasize the results. They have no limiting character, their sole purpose being to illustrate the application of the process according to the invention. The details of execution can be modified within the scope of technical equivalents without departing from the invention.

*Example 1*

Oxygenated water is manufactured with the aid of a carrier solution initially having an alkylanthraquinone content of 250 g./kg. After numerous cycles, this solution contains only 112 g./kg. of active quinones, being 67 g. of alkylanthraquinone and 45 g. of tetrahydroalkylanthraquinone, corresponding to 44.8% of the original content.

This solution, withdrawn after the stage of extraction with water, is subjected to washing by means of an equal volume of a 12 N solution of hydrochloric acid, at 50° C. for 15 minutes, then washed several times with water until complete elimination of the chlorides.

The content of active quinones in the solution, after this treatment, has risen again to 240 g./kg., being 72 g. of alkylanthraquinone and 168 g. of tetrahydroalkylanthraquinone, which corresponds to 96% of the initial content.

The yield of regeneration thus reaches:

$$100\% \times \left(\frac{96-44.8}{100-44.8}\right)=92.6\%$$

Before the treatment for regeneration of the degradation product, the working solution contains metallic impurities consisting of organic compounds of nickel and iron; the content of nickel was 300 mg./kg. and that of iron was 9 mg./kg. After the treatment it is calculated that the contents had fallen respectively to less than 0.05 mg./kg. and 0.007 mg./kg.

*Example 2*

A working solution has an initial content of alkylanthraquinone of 195 g./kg. After a series of recycles for the manufacture of oxygenated water, it contains no more than 117 g. of active quinones, being 74 g. of alkylanthraquinone and 43 g. of tetrahydroalkylanthraquinone, which corresponds to about 60% of the initial content.

This solution is subjected twice to washing, volume for volume, with 12 N hydrochloric acid for 90 minutes at ambient temperature, then several times with water.

The active quinone content has then risen to 176 g./kg., being 76 g. of alkylanthraquinone and 100 g. of tetrahydroalkylanthraquinone, that is about 90% of the initial content.

The yield of the regeneration thus reaches:

$$100 \times \left(\frac{90-60}{100-60}\right)=75\%$$

*Example 3*

A working solution which contains initially 264 g. of alkylanthraquinone per kg., contains after a certain period of use only 157 g. of active quinones, made up of 123 g. of alkylanthraquinone and 34 g. of tetrahydroalkylanthraquinone. This content corresponds to about 59.5% of the initial content.

After extraction of the hydrogen peroxide by means of water, hydrogen chloride is bubbled through the carrier solution for 15 minutes at 20° C., which is then washed with water to eliminate chlorides.

In the treated solution there are found, per kg., 238 g. of active quinones, being 123 g. of alkylanthraquinone and 115 g. of tetrahydroalkylanthraquinone, that is about 90.1% of the initial content.

The yield of regeneration in this case reaches:

$$100 \times \left(\frac{90.1-59.5}{100-59.5}\right)=75.6\%$$

It is seen in these three examples that the greater part of the product of degradation is transformed into tetrahydroalkylanthraquinone. It is easy to convert this product into alkylanthraquinone by a known process, particularly by oxidation by means of air in the presence of an alkali in alcoholic solution. The final product will then be capable of serving purposes similar to those of a freshly applied working solution and the losses of quinone are reduced by a much greater proportion than that inherent in regeneration processes known hitherto.

We claim:

1. The method of regenerating the inert regenerable materials in a working solution of a working intermediate selected from the group consisting of alkylanthraquinones, tetrahydroalkylanthraquinones and mixtures thereof in an organic solvent, which solution has become degraded through use in cyclic reduction and oxidation operations for the production of hydrogen peroxide, said degraded solution containing degradation products which are regenerable to alkylanthraquinones, and degradation products which are not regenerable to alkylanthraquinones, said method comprising the steps of treating said degraded working solution, after the oxidation phase and after the extraction of hydrogen peroxide, with a regenerating agent consisting essentially of a mineral acid, at a temperature comprised between room temperature and the boiling point of said working solution to regenerate the regenerable degradation products to tetrahydroalkylanthraquinones, and washing the thus-treated working solution with water, said acid being used in concentration of at least 2 N when the acid is employed in aqueous solution.

2. The method of regenerating the inert regenerable materials in a working solution of a working intermediate selected from the group consisting of alkylanthraquinones, tetrahydroalkylanthraquinones and mixtures thereof in an organic solvent, which solution has become degraded through use in cyclic reduction and oxidation operations for the production of hydrogen peroxide, said degraded solution containing degradation products which are regenerable to alkylanthraquinones, and degradation products which are not regenerable to alkylanthraquinones, said method comprising the steps of treating said degraded working solution, after the oxidation phase and after the extraction of hydrogen peroxide, with a regenerating agent consisting essentially of an aqueous solution of a mineral acid having a concentration of at least 2 N, at a temperature comprised between room temperature and the boiling point of said working solution to regenerate the regenerable degradation products to tetrahydroalkylanthraquinones, separating the aqueous phase, washing said working solution with water and treating said working solution to convert the tetrahydroalkylanthraquinones into alkylanthraquinones.

3. The method of regenerating the inert regenerable materials in a working solution of a working intermediate selected from the group consisting of alkylanthraquinones, tetrahydroalkylanthraquinones and mixtures thereof in an organic solvent, which solution has become degraded through use in cyclic reduction and oxidation operations for the production of hydrogen peroxide, said degraded solution containing degradation products which are regenerable to alkylanthraquinones, and degradation products which are not regenerable to alkylanthraquinones, said method comprising bubbling through said working solution, after the oxidation phase and after the extraction of hydrogen peroxide, a regenerating agent consisting essentially of a mineral acid in the gaseous state at a temperature comprised between room temperature and the boiling point of said working solution, washing said working solution with water, and treating said working solution to convert the tetrahydroalkylanthraquinones into alkylanthraquinones.

4. The method of regenerating the inert regenerable materials in a working solution of a working intermediate selected from the group consisting of alkylanthraquinones, tetrahydroalkylanthraquinones and mixtures thereof in an organic solvent, which solution has become degraded through use in cyclic reduction and oxidation operations for the production of hydrogen peroxide, said degraded solution containing degradation products which are regenerable to alkylanthraquinones, and degradation products which are not regenerable to alkylanthraquinones, said method comprising treating said degraded working solution, after the oxidation phase and after the extraction of hydrogen peroxide, with a regenerating agent consisting essentially of an aqueous solution of a mineral acid having a concentration of at least 6 N at a temperature comprised between 40 and 80° C., to regenerate the regenerable degradation products to tetrahydroalkylanthraquinones, separating the aqueous phase, washing said working solution with water, and treating said working solution to convert the tetrahydroalkylanthraquinones into alklyanthraquinones.

References Cited by the Examiner
UNITED STATES PATENTS

| | | | |
|---|---|---|---|
| 1,591,712 | 7/26 | Lewis | 260—369 |
| 1,890,040 | 12/32 | Luttringhaus et al. | 260—369 |
| 2,901,490 | 8/59 | Sprauer | 260—369 |
| 2,901,491 | 8/59 | Eller et al. | 260—369 |

FOREIGN PATENTS

| | | |
|---|---|---|
| 1,129,137 | 5/62 | Germany. |

LORRAINE A. WEINBERGER, *Primary Examiner.*

CHARLES B. PARKER, LEON ZITVER, *Examiners.*